United States Patent [19]

Glass

[11] 4,423,716
[45] Jan. 3, 1984

[54] FUEL SYSTEM FOR INTERNAL COMBUSTION ENGINES

[75] Inventor: James W. Glass, New Castle, Pa.

[73] Assignee: Ennco Inc., Las Vegas, Nev.

[21] Appl. No.: 321,820

[22] Filed: Nov. 16, 1981

[51] Int. Cl.³ ............................................ F02M 31/00
[52] U.S. Cl. .................................... 123/557; 123/527; 123/558; 123/549; 48/180 C
[58] Field of Search .................... 123/557, 558, 25 B, 123/527, 552, 525, 549; 48/180 H, 180 C

[56] References Cited

U.S. PATENT DOCUMENTS

| | | | |
|---|---|---|---|
| 2,744,387 | 5/1956 | Reed | 123/557 |
| 4,023,538 | 5/1977 | Harpman | 48/180 H |
| 4,050,419 | 9/1977 | Harpman | 48/180 H |
| 4,112,889 | 9/1978 | Harpman | 123/557 |
| 4,114,566 | 9/1978 | Harpman | 123/557 |
| 4,145,998 | 3/1979 | Mahoney | 123/557 |
| 4,151,821 | 5/1979 | Wichman | 123/558 |
| 4,197,819 | 4/1980 | Mahoney | 123/558 |

Primary Examiner—Ronald H. Lazarus
Attorney, Agent, or Firm—Harpman & Harpman

[57] ABSTRACT

A fuel system for an internal combustion engine of the piston type vaporizes liquid fuel such as gasoline and delivers the same through a series of intercommunicating control valves, two of which are responsive in operation to inlet manifold pressure in the internal combustion engine and another of which is responsive in operation to accelerator linkage for controlling the internal combustion engine's operation. The system includes a hot fuel gas generator which is preferably electrically energized, a device for delivering liquid fuel to the generator and tubes establishing communication between the generator, the inlet manifold pressure responsive valves, the accelerator linkage mechanical control valve, and an adaptor block mounted on the inlet manifold of the internal combustion engine. A conventional carburetor may be carried on the adaptor block along with a conventional air cleaner as known in the art. A device delivers air under pressure to the air cleaner and another device delivers a controlled amount of water to the adaptor block. The gaseous state of the fuel produced by the generator represents molecules at the greatest degree of separation from each other providing the greatest opportunity for contact of the reacting species in the gaseous conditions as chemical reactions occur only between particles at the atomic or molecular level and it is necessary for the reacting species to be in actual contact at the time of reaction. The fuel system enables complete combustion and elimination of atmospheric pollutants common in the operation of internal combustion engines and substantially increases the energy obtained from the fuel.

8 Claims, 7 Drawing Figures

FUEL SYSTEM FOR INTERNAL COMBUSTION ENGINES

BACKGROUND OF THE INVENTION

1. Field of the Invention

This invention relates to fuel systems and fuel gas generators for internal combustion engines.

2. Description of the Prior Art

Fuel systems for internal combustion engines have generally used carburetors in which the gasoline is sprayed into a stream of air and divided into a series of fine droplets approaching vaporization and conveyed to the point of combustion by way of the inlet manifold of the engine. Only those molecules at the surface of the gasoline droplets are in a position to react with another species and incomplete combustion results because the very short time allowed is insufficient for more than a little vaporization of the fuel to occur. Internal combustion engines therefore exhaust large quantities of unburned hydrocarbons, carbon monoxide and oxides of nitrogen, all of which are undesirable atmospheric pollutants.

Several attempts to improve vaporization have been made and such devices may be seen in U.S. Pat. Nos. 3,968,775 and 4,112,889 wherein prior devices are disclosed. The devices disclosed in these patents were unable to supply a gaseous fuel to an internal combustion engine under all operating conditions.

Other attempts to produce a gaseous fuel for an internal combustion engine may be seen in U.S. Pat. Nos. 4,023,538, 4,050,419, 4,114,566, 4,145,988 and 4,197,819.

The inventions disclosed in this group of patents introduced water with the liquid fuel and attempted simultaneous vaporization thereof. Devices formed in accordance with these several patents performed satisfactorily under ideal operating conditions, but were frequently ineffective due to the condensation of the liquid fuel vapor and steam into droplets which resulted in incomplete combustion of the fuel mixture and occasional stalling of the internal combustion engines equipped with the devices.

This invention relates to a fuel system and vaporizer for an internal combustion engine, the system including a fuel gas generator in the form of a hollow body in which an electrical resistance heater is positioned and maintained at an optimum temperature sufficient to instantly vaporize the liquid fuel, such as gasoline, introduced thereinto. The hot gaseous fuel then moves into the inlet manifold of the internal combustion engine by way of heated pressure responsive valves, a mechanical valve and an adaptor plate through which combustion air is introduced.

SUMMARY OF THE INVENTION

A fuel system and vaporizer for an internal combustion engine is disclosed in which gasoline is vaporized to produce a hot gaseous fuel under pressure incorporates control valves, two of which are responsive in operation to inlet manifold pressure and another of which is controlled by the positioning of the accelerator linkage used to control the operation of the engine. The fuel leaving the three control valves enters the inlet manifold of the internal combustion engine through an adaptor plate on which a conventional carburetor and air cleaner are mounted and used for directing combustion air into the inlet manifold.

DESCRIPTION OF THE PREFERRED EMBODIMENT

Figures 6, 7:
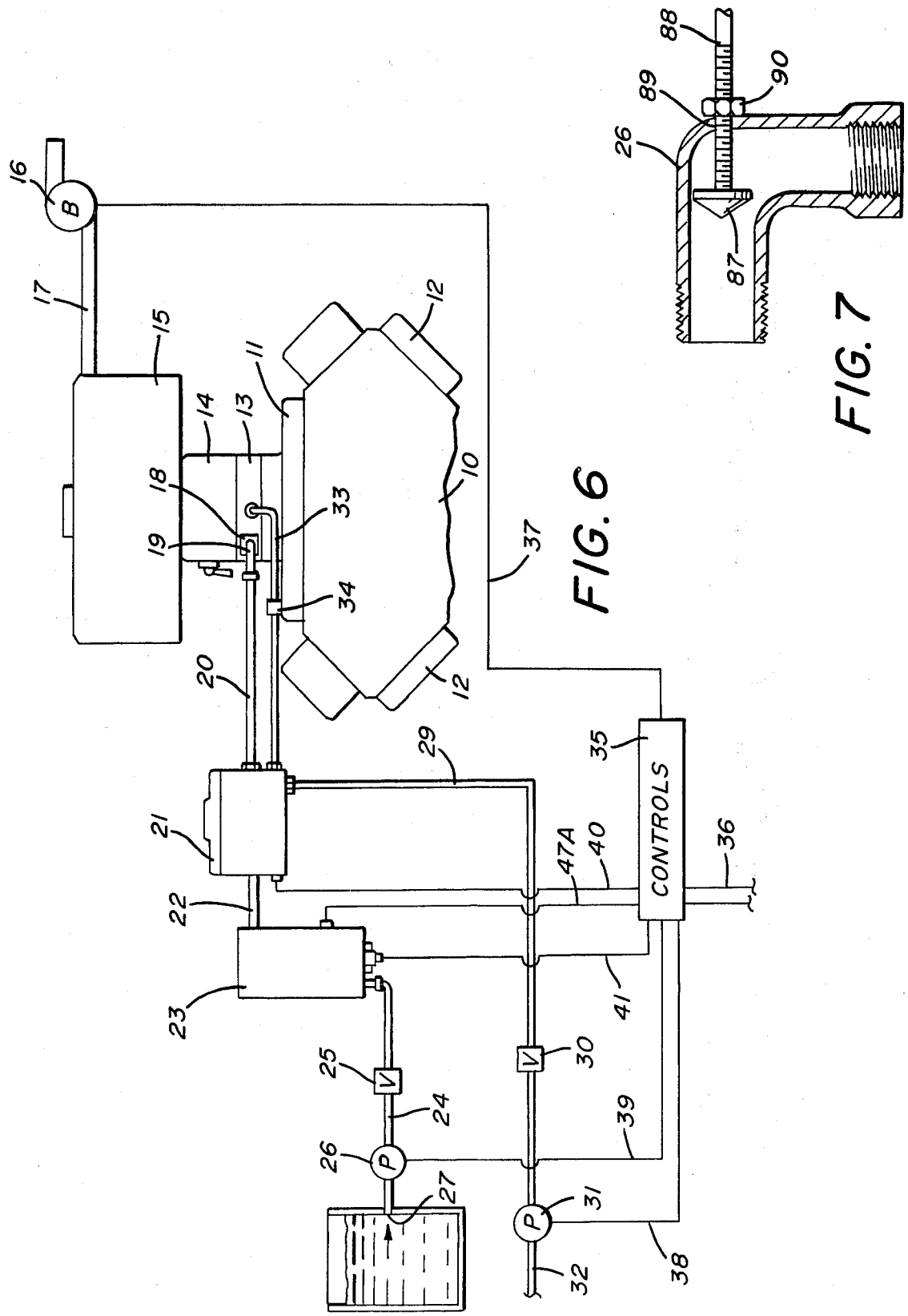
FIG. 6 is a diagrammatic illustration of the fuel system.
FIG. 7 is a cross sectional detail of an adjustable elbow incorporated in the fuel system.

By referring to the drawings and FIG. 6 in particular, a diagrammatic illustration of the fuel system and vaporizer in communication with an internal combustion engine may be seen in which the engine is indicated by the numeral 10, the inlet manifold thereof by the numeral 11, and the exhaust manifolds thereof by the numerals 12. An adaptor plate 13 is mounted on the inlet manifold 11 in communication therewith and it supports a carburetor 14 which in turn carries an air cleaner 15 so that combustion air may be delivered thereby to the inlet manifold 11. A blower 16 is in communication by way of a tube 17 with the air cleaner 15 to provide a positive combustion air supply. A control valve 18 registers with an inlet port in the adaptor plate 13 and an adjustable elbow valve 19 communicates therewith and with a tube 20 which in turn communicates with an inlet manifold pressure responsive dual valve 21. The valve 21 is closely coupled by a pipe 22 with a hot fuel gas generator 23 and liquid fuel such as gasoline is supplied to the hot fuel gas generator 23 through a tube 24 in which a check valve 25 is positioned, the fuel being moved by a pump 26 from a fuel supply source 27. A heat exchanger 28 is positioned in the dual pressure responsive valve 21 and a tube 29 connecting therewith establishes communication with a pressure regulator 30, a pump 31 and a source of water 32. A secondary tube 33 communicates with the heat exchanger 28 and by way of a check valve 34 with the adapter plate 13. An electronic control 35 is provided with electrical energy from a power source, such as an automotive battery or generator, by way of conductors 36, and conductors 37 extend therefrom to the blower 16, conductors 38 extend from the control 35 to the pump 31, and conductors 39 extend from the control 35 to the pump 26. Conductors 40 extend from the control 35 to a heating element in the dual valve 21 and conductors 41 extend from the control 35 to the heating element in the hot fuel gas generator 23.

Figure 1:
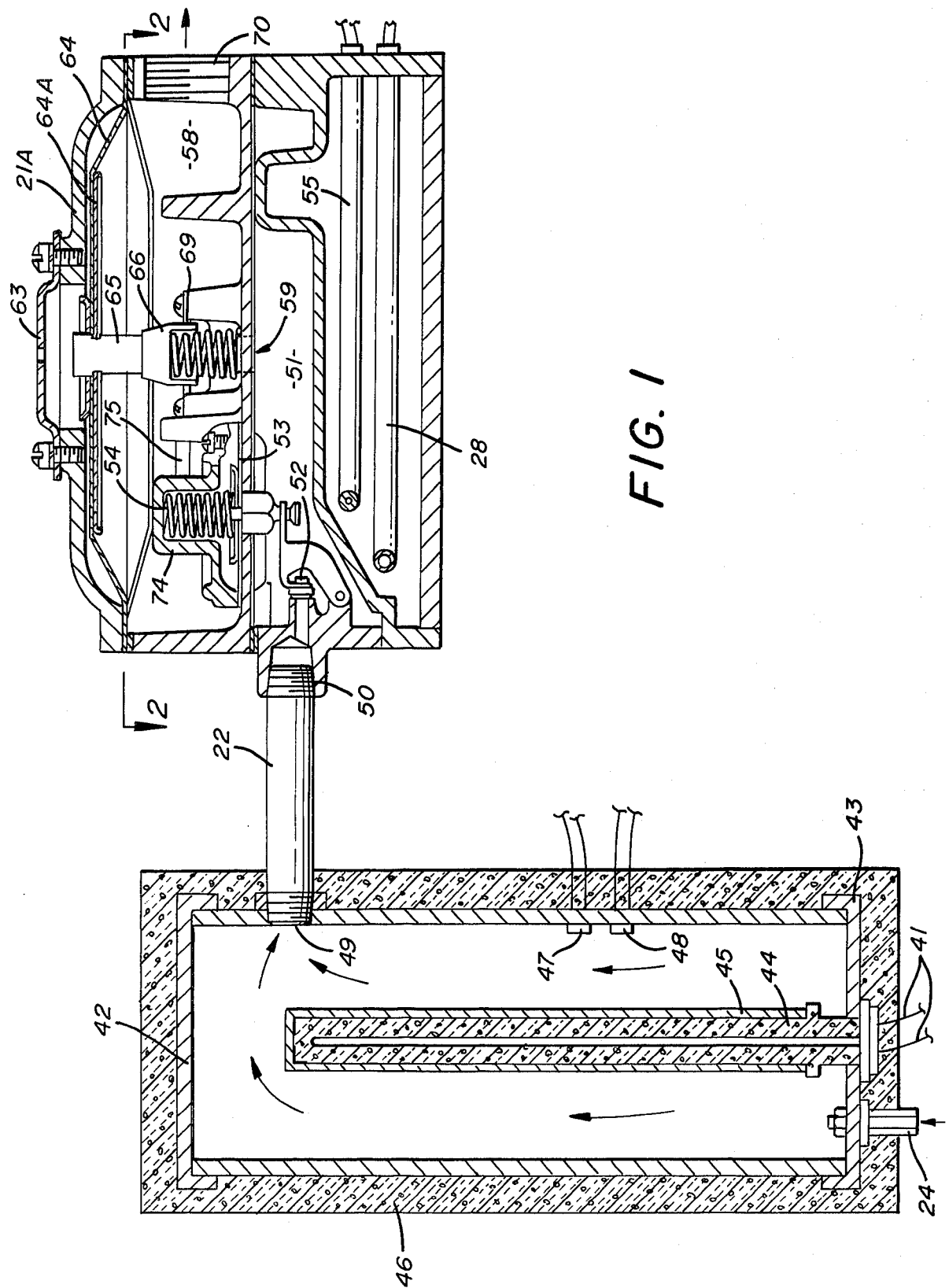
FIG. 1 is a cross sectional side elevation of a fuel gas generator and inlet manifold pressure responsive control valves used in the fuel system.

By referring now to FIG. 1 of the drawings, it will be seen that the fuel gas generator 23 comprises a cylindrical hollow body closed at its upper and lower ends 42 and 43 respectively, the lower end 43 having a central opening therein in which a jacketed electrical resistance heating element 44 is mounted in a liquid tight manner. The electrical resistance heating element 44 is preferably jacketed in a metal jacket 45 and the fuel gas generator 23 has an enveloping insulating jacket 46.

The insulation can comprise any thermally effective insulating material that is able to withstand deterioration from the inherent heat in the fuel gas generator 23 as fibrous silica alumina or the like. The electrical resistance heater 44 is of a size capable of maintaining a temperature of approximately 450 F. in the fuel gas generator 23 which is sufficient to instantly vaporize gasoline delivered thereinto through the tube 24. It has been determined that an electrical resistance heating element rated at 500 watts and operating on 12 volts direct current is satisfactory. The area within the cylindrical body of the fuel gas generator 23 around the jacketed electrical resistance heating element 44 confines and directes the liquid fuel delivered in the lower portion thereof in a manner so that it is in close association with the jacketed heating element 44 throughout its travel in the fuel gas generator 23. Temperature and pressure sensors 47 and 48 respectively are positioned in the fuel gas generator 23 and conductors 47A extend therefrom to the electronic control device 35 so that the operation of the fuel delivering pump 26 and the energization of the electrical resistance heating element 44 are suitably controlled to maintain the desired temperature and flow of hot gaseous fuel from the fuel gas generator. An outlet port 49 in the fuel gas generator 23 is closely coupled by the pipe 22 with an inlet port 50 in the inlet manifold pressure responsive dual valve 21.

Figure 3:
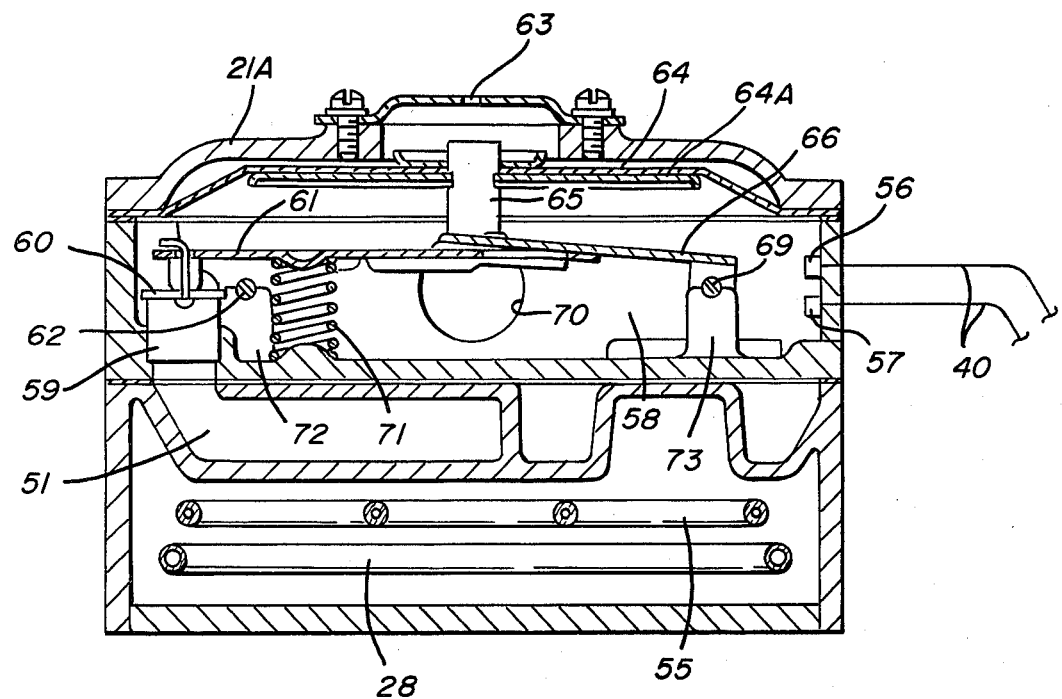
FIG. 3 is a cross section on line 3—3 of FIG. 2.

By referring to FIGS. 1 and 3 of the drawings, it will be seen that the valve 21 has a first chamber 51 with which the inlet port 50 communicates by way of a first valve 52, diaphragm 53, and spring regulator 54. The chamber 51 is heated by a second heat exchanger 55, preferably an electrical resistance element controlled by temperature and pressure sensors 56 and 57. The heat exchanger 28 has a portion thereof adjacent a second heat exchanger 55, a second chamber 58 in the dual valve 21 communicates with the chamber 51 by way of a cylindrical valve seat 59. A valve element 60 is arranged for movement toward and away from the valve seat 59. The valve element 60 is attached to a first lever 61 which lever is pivoted by a pin 62 to a portion of the body of the valve 21 and within the chamber 58 defined therein by a closure 21A, a portion of which is apertured as at 63. A diaphragm 64 is positioned across the chamber 58 and secured in that relation by the joining portions of the closure 21A and the upturned wall of the body of the valve 21 which forms the chamber 58. A plate 64A under the diaphragm 64 cooperates with a fastener 65 extending through the diaphragm 64, the fastener 65 depending from the assembly for engagement with a second lever 66 adjacent one end thereof. The second lever 66 is pivoted to a portion of the body of the valve 21 by a pivot pin 69 and the second lever 66 overlies a portion of the first lever 61, the arrangement being such that movement of the diaphragm 64 responsive to negative inlet manifold pressure communicating with the chamber 58 by way of an outlet port 70 in the valve 21 moves the fastener 65 downwardly against the lever 66 which in turn engages the first lever 61. A spring 71 is positioned beneath a portion of the first lever 61 and between the pivot pin 62 and the outer or free end of the first lever 61 so that it normally urges the other end of the first lever 61 and the valve element 60 downwardly into closed relation with the valve seat 59.

It will thus be seen that negative or sub-atmospheric pressure in the inlet manifold upon increasing to a greater number of inches of mercury as commonly used in measuring such inlet manifold pressure, permits atmospheric air to enter the aperture 63 and engage the upper surface of the diaphragm 64 and move the lever 66 downwardly whereupon the leverage of the motion is applied to the free end of the first lever 61 with the result that the valve element 60 moves away from the opening defined by the valve seat 59 and permits a greater amount of hot gaseous fuel to flow through the chamber 58 and to the inlet manifold of the internal combustion engine.

Conversely, a lesser amount of negative pressure in the inlet manifold results in moving the valve element 60 toward the opening defined by the valve seat 59 and thereby reduces the amount of hot gaseous fuel flowing through the inlet manifold pressure responsive valve 21.

The pressure and temperature sensors 56 and 57 in the valve 21 are electrically connected with the control device 35 so that the desirable operating temperature of approximately 450° F. may be maintained in the valve 28 at all times.

Figure 2:
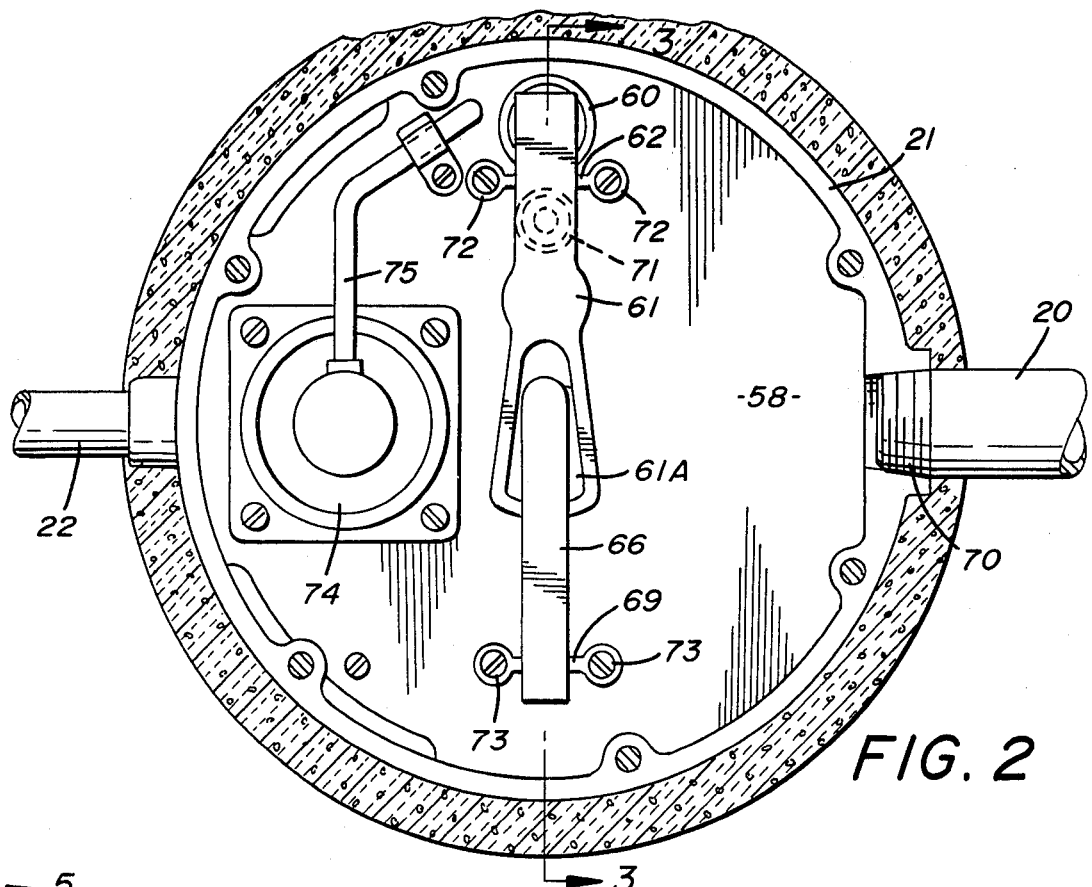
FIG. 2 is a cross section on line 2—2 of FIG. 1.

In FIG. 2 of the drawings, a cross sectional view of the valve 21 may be seen and it will be observed that the pivot pins 62 and 69 are carried on elevated supports 72 and 73 respectively which are located in pairs at the opposite sides of the first and second levers 61 and 66 respectively.

It will also be seen that the first lever 61 has a cutaway area 61A adjacent its free end in which the free end of the second lever 66 is slidably engaged when the relative position of the levers change.

The diaphragm 53 and spring regulator 54 are positioned in a case 74 in the chamber 58 and a tube 75 transfers pressure changes between the case 74 and area of the chamber 58 adjacent the valve seat 59. As engine demand increases, fuel flow through the valve seat 69 creates a pressure drop in the tube 75 and the atmospheric side of the diaphragm 53 creating less resistance to movement of diaphragm 53 and valve 52. The result is an improved balance between the atmospheric and negative pressure sides of the diaphragm 53 and more accurate registration of the valve opening.

Figure 4:
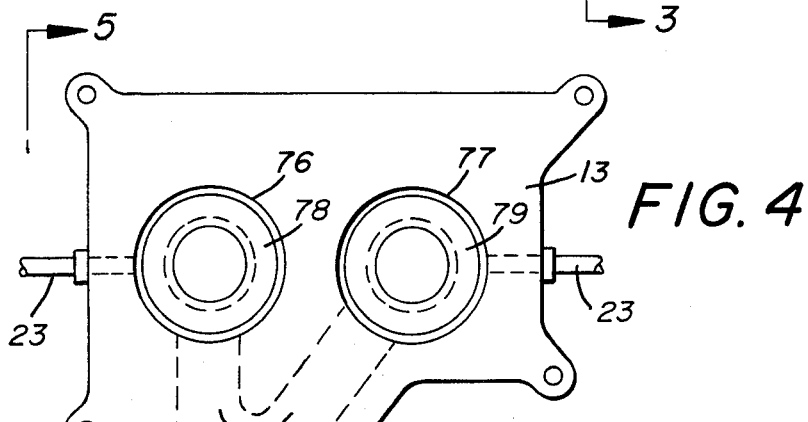
FIG. 4 is a top plan view of an adaptor plate and a mechanical control valve carried thereby and comprising part of the fuel system.
Figure 5:
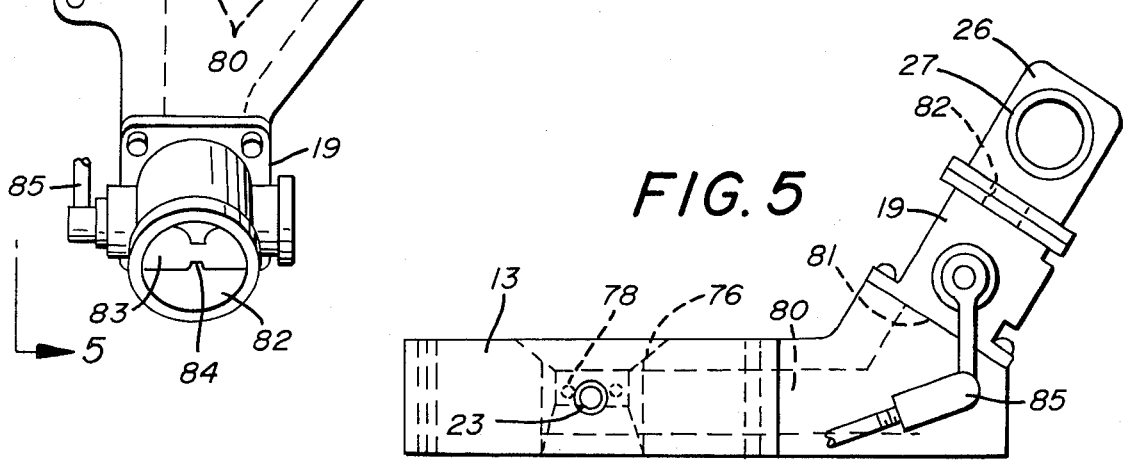
FIG. 5 is a side elevation of the adaptor plate and valve shown in FIG. 4.

By referring now to FIGS. 4 and 5 of the drawings, it will be seen that the adaptor plate 13 has a pair of vertical openings 76 and 77 therethrough in which circular body members 78 and 79 are positioned, each of the body members 78 and 79 having a plurality of circumferentially spaced openings therein. The openings 76 and 77 register with similarly shaped and positioned openings in the inlet manifold 11, and the carburetor 14, as illustrated in FIG. 6 of the drawings, is positioned on the adaptor plate 13 in communication with the openings 76 and 77. Passageways 80 in the adaptor plate 13 communicate with the openings 76 and 77 by way of the circular apertured body members 78 and 79 and with an inlet port 81. The control valve 19 is mounted on the portion of the adaptor plate 13 surrounding the inlet port 81. The control valve 19 has an inlet port 82 which in turn communicates with the adjustment elbow 26, which is hereinbefore noted, communicates with the inlet manifold pressure responsive control valve 21 by way of the tube 20.

Still referring to FIGS. 3 and 4 of the drawings, it will be seen that the control valve 19 has a transversely positioned rotatable valve element 83, the center portion of which has modified V-shaped cutaway areas 84 therein. The arrangement is such that rotation of the rotatable valve element 83 as by a lever 85 on the exterior of the valve will rotate the valve element 83 and rapidly open the passageway for the hot fuel gas therethrough or rapidly close it. Linkage 86 on the lever 85 leads to the accelerator linkage of the vehicle in which the internal combustion engine having the fuel system is installed. The same linkage is connected to the butterfly valve of the carburetor 14 and those skilled in the art will observe that when desired the system can be operated as in cold starting by utilizing the carburetor 14 and that after a minute or two the fuel system and its fuel gas generator 23 will have become operable whereupon the fuel to the carburetor is discontinued and the internal combustion engine 10 then operates solely on the hot fuel gas supplied by the system.

In FIG. 7 of the drawings, the adjustment elbow 26 is illustrated and it will be seen that it has a cone-shaped valve element 87 on a threaded support stem 88, which in turn is threadably engaged in a threaded opening 89 in the elbow 26 and the stem 88 is provided with a lock nut 90. The maximum volume of hot fuel gas flowing from the valve 21 to the valve 19 is thus controlled by the setting of the conical valve element 87.

The electrical resistance heating elements 44 and 55 may be replaced by tubes containing a known quanity of mercury or the like and extending into an exhaust manifold of the internal combustion engine, the arrangement providing space for expansion of the mercury and/or vaporization thereof at about 650° F. (356° C.) so that a desirable temperature of approximately 450° F. (232° C.) may be automatically maintained.

It will thus be seen that a fuel system and vaporizer for an internal combustion engine has been disclosed which is capable of supplying the internal combustion engine with highly volatile hot combustible gaseous fuel capable of being completely consumed in operation with nearly all of the energy thereof utilized by the internal combustion engine. The total combustion of the gaseous fuel almost completely eliminates the pollutants normally associated with an internal combustion engine. In dynamometer tests of a 305 cubic inch V-8 gasoline engine operating on the conventional carburetor averaged 14½ miles per gallon and when operating on the fuel system disclosed herein averaged 42 miles per gallon.

Having thus disclosed my invention, what I claim is:

1. In a fuel supplying system for an internal combustion engine having an inlet manifold, comprising: a device in communication with said inlet manifold, air supplying means in communication with said device, a throttle valve in communication with said device, at least one valve responsive in operation to inlet manifold pressure upstream of said throttle valve, a hot fuel gas generator upstream of said pressure responsive valve, fuel supplying means adapted to supply liquid fuel at predetermined fuel pressure to said hot fuel gas generator and temperature and pressure sensor means in said hot fuel gas generator for emitting signals representative of temperature and pressure in said hot fuel gas generator; signal comparator/controller means coupled to said sensor means, fuel regulating means positioned in said fuel supplying means and heating means positioned in said hot fuel gas generator coupled to said comparator/controller means and responsive to said signals for regulating fuel supplied to said hot fuel gas generator and for regulating said heating means so as to maintain known temperatures therein sufficient to gasify said liquid fuel, the improvement wherein said device, throttle valve, the valve responsive in operation to inlet manifold pressure and the hot fuel gas generator are adjacent to and in communication with one another and the throttle valve is arranged to finally control the hot gaseous fuel supplied the engine through said device, and secondary heating means provided in said inlet manifold pressure responsive valve.

2. In a fuel supplying system for an internal combustion engine having an inlet manifold, comprising: a device in communication with said inlet manifold, air supplying means in communication with said device, a throttle valve in communication with said device, at least one valve responsive in operation to inlet manifold pressure upstream of said throttle valve, a hot fuel gas generator upstream of said pressure responsive valve, fuel supplying means adapted to supply liquid fuel at predetermined fuel pressure to said hot fuel gas generator and temperature and pressure sensor means in said hot fuel gas generator for emitting signals representative of temperature and pressure in said hot fuel gas generator; signal comparator/controller means coupled to said sensor means, fuel regulating means positioned in said fuel supplying means and heating means positioned in said hot fuel gas generator coupled to said comparator/controller means and responsive to said signals for regulating fuel supplied to said hot fuel gas generator and for regulating said heating means so as to maintain known temperatures therein sufficient to gasify said liquid fuel, the improvement wherein said valve responsive in operation to inlet manifold pressure comprises a hollow body having means therein defining two chambers, a first valve in one of said chambers controlling an inlet port in said valve, a diaphragm and spring regulator normally biasing said first valve to a closed position and operable to open said first valve upon a reduction of pressure in the other one of said chambers, a port establishing communication between said chambers and a secondary valve in said port, a secondary diaphragm and secondary spring regulator normally biasing said secondary valve toward closed position, an outlet port in said secondary chamber communicating with said throttle valve, said secondary diaphragm responsive to pressure changes in said other one of said chambers, a drop in said pressure occasioned by increased engine demand moving said secondary diaphragm to open said secondary valve, means for heating said pressure responsive valve, temperature sensor means in said pressure responsive valve emitting a signal representative of temperature in said pressure responsive valve; signal comparator/controller means coupled to said sensor and a source of energy for said heater for maintaining temperatures therein sufficient to maintain said gaseous fuel flowing therethrough in gaseous state.

3. In a fuel supplying system for an internal combustion engine having an inlet manifold, comprising: a device in communication with said inlet manifold, air supplying means in communication with said device, a throttle valve in communication with said device, at least one valve responsive in operation to inlet manifold pressure upstream of said throttle valve, a hot fuel gas generator upstream of said pressure responsive valve, fuel supplying means adapted to supply liquid fuel at predetermined fuel pressure to said hot fuel gas generator and temperature and pressure sensor means in said hot fuel gas generator for emitting signals representative of temperature and pressure in said hot fuel gas generator; signal comparator/controller means coupled to said sensor means, fuel regulating means positioned in said fuel supply source and heating means positioned in said hot fuel gas generator coupled to said comparator/controller means and responsive to said signals for regulating fuel supplied to said hot fuel gas generator for regulating said heating means so as to maintain known temperatures therein sufficient to gasify said liquid fuel, the improvement wherein said device in communication with said inlet manifold comprises an adaptor body, passageways through said adaptor body in communication with said air supplying means and said inlet manifold and secondary passageways in said adaptor body communicating with said first mentioned passageways and said throttle valve; means for imparting movement to said throttle valve whereby the vaporized fuel passes from the hot fuel vaporizer to the inlet manifold pressure responsive valve, then through the throttle valve and the secondary passage to the first mentioned passageway where the vaporized fuel communicates with the air supply.

4. The improvement in a fuel supplying system set forth in claim 3 and wherein at least one additional passageway in said adaptor body communicates with said first mentioned passageways, a source of heated water in communication with said additional passageway and means for controlling said heated water delivered to said additional passageway.

5. The improvement in a fuel supplying system set forth in claim 4 and wherein the source of heated water comprises a reservoir, a heat exchanger in said pressure responsive valve in communication with said reservoir, said heat exchanger communicating with said passageway.

6. The improvement in a fuel supplying system set forth in claim 1 and wherein said air supplying means comprises a carburetor and an air cleaner in communication therewith, said carburetor having a butterfly valve and means for simultaneously moving said butterfly valve and said throttle valve, fuel supplying means in communication with said carburetor and means controlling said fuel supplying means for said carburetor and means responsive in operation to said signal comparator/controller means for controlling said fuel supply to said carburetor.

7. The improvement in a fuel supplying system set forth in claim 2 and wherein said air supplying means comprises a carburetor and an air cleaner in communication therewith, said carburetor having a butterfly valve and means for simultaneously moving said butterfly valve and said throttle valve, fuel supplying means in communication with said carburetor and means controlling said fuel supplying means for said carburetor and means responsive in operation to said signal comparator/controller means for controlling said fuel supply to said carburetor.

8. The improvement in a fuel supplying system set forth in claim 3 and wherein said air supplying means comprises a carburetor and an air cleaner in communication therewith, said carburetor having a butterfly valve and means for simultaneously moving said butterfly valve and said throttle valve, fuel supplying means in communication with said carburetor and means controlling said fuel supplying means for said carburetor and means responsive in operation to said signal comparator/controller means for controlling said fuel supply to said carburetor.

* * * * *